No. 790,404. PATENTED MAY 23, 1905.
G. S. SQUIRES.
TIRE FOR VEHICLES.
APPLICATION FILED SEPT. 17, 1904.

Witnesses:
Sydney C. Taft.
Franklin E. Low.

Inventor:
George S. Squires.
by his Attorney
Charles S. Gooding.

No. 790,404. Patented May 23, 1905.

UNITED STATES PATENT OFFICE.

GEORGE S. SQUIRES, OF BOSTON, MASSACHUSETTS.

TIRE FOR VEHICLES.

SPECIFICATION forming part of Letters Patent No. 790,404, dated May 23, 1905.

Application filed September 17, 1904. Serial No. 224,798.

*To all whom it may concern:*

Be it known that I, GEORGE S. SQUIRES, a citizen of the United States, residing at Boston, in the county of Suffolk and State of Massachusetts, have invented new and useful Improvements in Tires for Vehicles, of which the following is a specification.

This invention relates to an improved tire for road-vehicles, such as automobiles.

The object of the invention is to provide a strong durable resilient tire which can be easily applied to the rim of a wheel and which it will be impossible to deflate by puncture.

The invention consists in a tire constructed as set forth in the following specification and particularly pointed out in the claims thereof.

Figure 2:
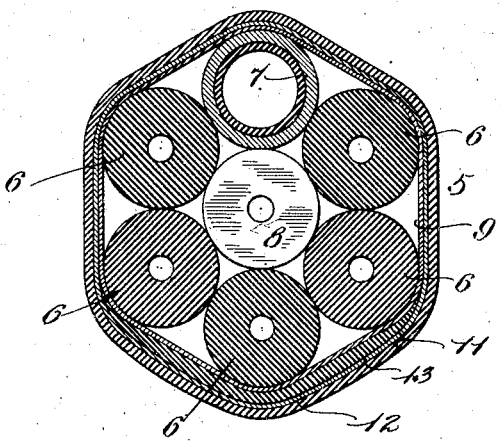
Figure 3:
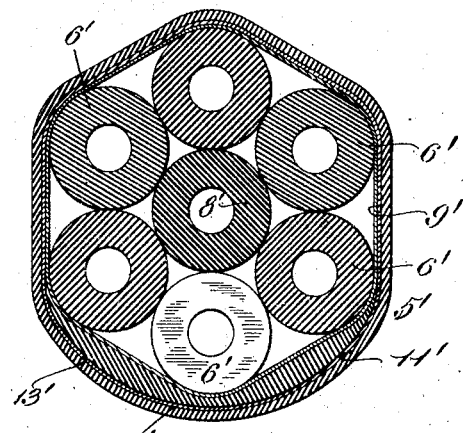
Figure 1:
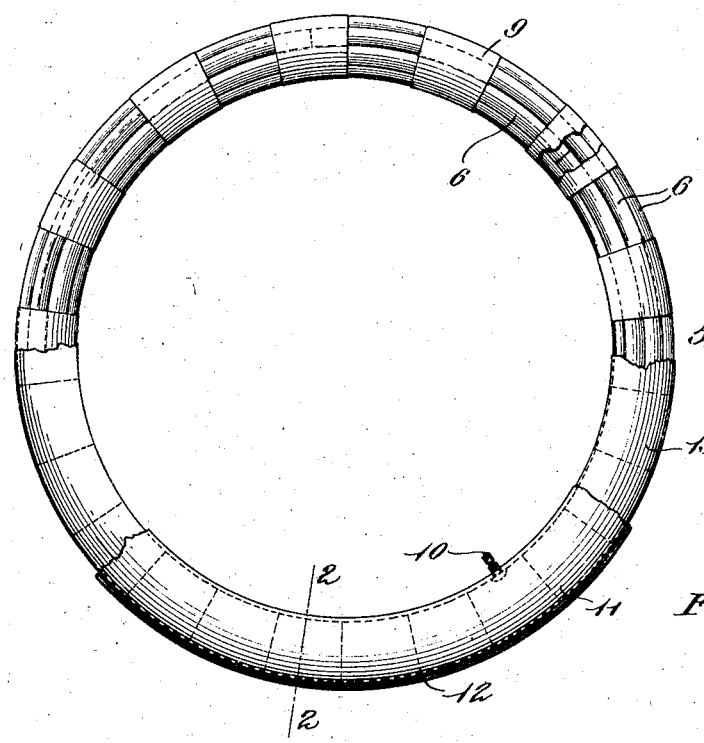
Figure 4:
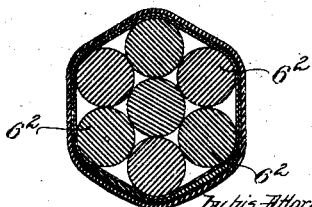

Referring to the drawings, Figure 1 is a side elevation of my improved tire, partly broken away for the purpose of illustration. Fig. 2 is a transverse section taken on line 2 2 of Fig. 1. Fig. 3 is a transverse section similar to Fig. 2 of a modified form of my invention. Fig. 4 is a transverse section similar to Fig. 2, upon a reduced scale, of another modified form of my invention.

Like numerals refer to like parts throughout the several views of the drawings.

In the drawings, Figs. 1 and 2, 5 is a tire consisting of a series of resilient tubes 6 6 and 7, arranged concentrically around a common central tube 8. The tubes 6 6 and 8 are constructed of rubber. Each of said tubes has its ends butted together, as seen in Fig. 1, the butted ends of one tube 6 breaking joints with the butted ends of the other tubes 6 and with the tube 8. Said tubes are lashed together by adhesive tape 9 at intervals throughout the circumference of the tire. After the tubes have been lashed together by adhesive tape said tubes are inclosed throughout their entire circumference by fabric 13, and finally the tire is completed by inclosing said tubes and fabric in a tubular covering 11.

The tube 7, Fig. 2, differs from the tubes 6 and 8 in said figure in that it is collapsible and is provided with means to inflate the same, consisting of an air-valve, the object of this construction being to deflate the tire 5 to a certain extent when the same is being removed from or placed upon the rim of a wheel.

In Fig. 3 a modified form of my invention is illustrated in which the tire 5' is formed of a series of resilient annular tubes 6', arranged concentrically about a common central tube 8'. The ends of each of said tubes are butted together and break joints one with another, as in the form hereinbefore described, and said tubes are fastened together by a tape 9', all of said tubes being inclosed in a fabric 13' and a tubular covering 11'.

In Fig. 2 the portion of the tire 12 forms the tread thereof, and in Fig. 3 the portion 12' forms the tread of the tire 5', said tread portions being thickened to increase the wearing capacity of the tire.

In Fig. 4 a modified form of my invention is illustrated in which the tubes $6^2$ $6^2$ are made in the shape of solid resilient rings, the rest of the construction of the tire being as hereinbefore described in relation to the forms illustrated in Figs. 1, 2, and 3.

It will readily be seen from the description hereinbefore set forth that my improved tire is very durable, cheap, and easily constructed and if punctured the tire will still remain serviceable for the use for which it is intended.

Having thus described my invention, what I claim, and desire by Letters Patent to secure, is—

1. A tire for vehicles comprising a series of resilient annular tubes tangent one to another and arranged concentrically around a common central tube, said tubes lashed together at intervals throughout the circumference thereof.

2. A tire for vehicles comprising a series of resilient annular tubes tangent one to another and arranged concentrically around a common central tube, said tubes lashed together at intervals throughout the circumference thereof, one of said tubes being collapsible and provided with means to inflate the same.

3. A tire for vehicles comprising a series of resilient annular tubes fastened together at intervals, said tubes inclosed within a tubular covering.

4. A tire for vehicles comprising a series of resilient annular tubes, the ends of said tubes butted together, said butted ends of one tube breaking joints with the butted ends of the other tubes, said tubes lashed together adjacent to said butted ends.

In testimony whereof I have hereunto set my hand in presence of two subscribing witnesses.

GEORGE S. SQUIRES.

Witnesses:
   CHARLES S. GOODING,
   JAMES E. LEE.